(12) United States Patent
Zhu et al.

(10) Patent No.: US 11,175,847 B2
(45) Date of Patent: Nov. 16, 2021

(54) DATA MERGING METHOD, CONTROL CIRCUIT UNIT AND STORAGE DEVICE FOR FLASH MEMORY

(71) Applicant: Hefei Core Storage Electronic Limited, Anhui Province (CN)

(72) Inventors: Qi-Ao Zhu, Anhui Province (CN); Wan-Jun Hong, Anhui Province (CN); Jing Zhang, Anhui Province (CN); Xin Wang, Anhui Province (CN); Xu Hui Cheng, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 34 days.

(21) Appl. No.: 16/822,023

(22) Filed: Mar. 18, 2020

(65) Prior Publication Data

US 2021/0223976 A1    Jul. 22, 2021

(30) Foreign Application Priority Data

Jan. 21, 2020 (CN) .......................... 202010070048.5

(51) Int. Cl.
  *G06F 3/06* (2006.01)
  *G06F 12/02* (2006.01)
(52) U.S. Cl.
  CPC .......... *G06F 3/0647* (2013.01); *G06F 3/0604* (2013.01); *G06F 3/0652* (2013.01); *G06F 3/0679* (2013.01); *G06F 12/0253* (2013.01); *G06F 2212/7205* (2013.01)

(58) Field of Classification Search
  CPC .... G06F 3/0647; G06F 3/0679; G06F 3/0604; G06F 3/0652; G06F 12/0253; G06F 2212/7205
  See application file for complete search history.

(56) References Cited

U.S. PATENT DOCUMENTS

| 7,890,550 | B2 * | 2/2011 | Jung ................... | G06F 12/0246 707/813 |
| 2012/0290768 | A1 * | 11/2012 | Rubowitz .......... | G06F 12/0253 711/103 |
| 2014/0215129 | A1 | 7/2014 | Kuzmin et al. | |
| 2021/0157723 | A1 * | 5/2021 | Byun ................. | G06F 12/0246 |

OTHER PUBLICATIONS

"Office Action of Taiwan Counterpart Application", dated Oct. 27, 2020, pp. 1-6.

* cited by examiner

*Primary Examiner* — Reginald G Bragdon
*Assistant Examiner* — Curtis James Kortman
(74) *Attorney, Agent, or Firm* — JCIPRNET (57) ABSTRACT

A data merging method for flash memory, a flash memory control circuit unit and a flash memory storage device are provided. The disclosure is applicable to a flash memory, an embedded memory device or a solid state drive of 3D structure. The method includes: selecting at least one source physical erasing unit from at least one first physical erasing unit according to a valid data count of the at least one first physical erasing unit and a valid data count of each of a plurality of memory sub-modules; and copying valid data in the at least one source physical erasing unit to at least one destination physical erasing unit to perform a valid data merging operation.

6 Claims, 7 Drawing Sheets

Selecting at least one source physical erasing unit from at least one first physical erasing unit according to a valid data count of the at least one first physical erasing unit and a valid data count of each of the memory sub-modules — S801

Copying valid data in the at least one source physical erasing unit to at least one destination physical erasing unit to perform a valid data merging operation — S803

DATA MERGING METHOD, CONTROL CIRCUIT UNIT AND STORAGE DEVICE FOR FLASH MEMORY

CROSS-REFERENCE TO RELATED APPLICATION

This application claims the priority benefit of China application serial no. 202010070048.5, filed on Jan. 21, 2020. The entirety of the above-mentioned patent application is hereby incorporated by reference herein and made a part of this specification.

BACKGROUND

1. Technology Field

The disclosure relates to a data merging method for flash memory, a flash memory control circuit unit and a flash memory storage device.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, the rewritable non-volatile memory module includes a plurality of physical erasing units, which are logically divided into a plurality of areas by a memory management circuit. These areas usually include a data area and a spare area. When receiving a write command and to-be-written data from the host system, the memory management unit retrieves a physical erasing unit from the spare area and writes the data into the retrieved physical erasing unit, so as to replace the physical erasing unit in the data area. When the number of spare physical erasing units in the spare area in the rewritable non-volatile memory module is not greater than a predefined value, the memory management circuit will perform a valid data merging operation. For example, the memory management circuit selects a plurality of physical erasing units with the least valid data (a.k.a. source physical erasing units) from the data area, and copies valid data from the source physical erasing units to a physical erasing unit (a.k.a. a destination physical erasing unit) in the spare area. Then, the memory management circuit performs an erasing operation on the source physical erasing units and re-associates the source physical erasing units with the spare area to increase the number of the physical erasing units in the spare area. In addition, the memory management circuit further associates the destination physical erasing unit with the data area.

However, the rewritable non-volatile memory module is usually composed of a plurality of memory sub-modules, and each of the memory sub-modules includes a plurality of physical erasing units. In an example where the rewritable non-volatile memory includes four memory sub-modules and a total of the source physical erasing units is eight, during the valid data merging operation, if five physical erasing units in the source physical erasing units are distributed in one memory sub-module, the remaining three source physical erasing units are then evenly distributed among other memory sub-modules (i.e., each of the other memory sub-modules includes one source physical erasing unit). When the memory sub-modules operates in parallel to move data in the source physical erasing units, compared with the other memory sub-modules, the memory sub-module including the five source physical erasing units needs to spend more time. In other words, the other memory sub-modules need to wait for the memory sub-modules including the five source physical erasing units to finish moving the data. This situation will result in low execution performance when the valid data merging operation is being performed. If the source physical erasing units are evenly distributed among the memory sub-modules, an optimal efficiency may be achieved when the valid data merging operation is performed based on the principle that the memory sub-modules operate in parallel.

Therefore, how to evenly distribute the source physical erasing units among the memory sub-modules of the rewritable non-volatile memory module to improve an execution efficiency of the valid data merging operation is one of problems to be solved by persons skilled in the art.

SUMMARY

The disclosure relates to a data merging method for flash memory, a flash memory control circuit unit and a flash memory storage device, which can improve the execution efficiency of the valid data merging operation.

The disclosure proposes a data merging method for flash memory adapted to a rewritable non-volatile memory module. The rewritable non-volatile memory module includes a plurality of memory sub-modules, and each of the memory sub-modules includes a plurality of physical erasing units. The method includes: selecting at least one source physical erasing unit from at least one first physical erasing unit in the physical erasing units according to a valid data count of the at least one first physical erasing unit and a valid data count of each of the memory sub-modules; and copying valid data in the at least one source physical erasing unit to at least one destination physical erasing unit in the physical erasing units to perform a valid data merging operation.

The disclosure proposes a flash memory control circuit unit for controlling a rewritable non-volatile memory module. The flash memory control circuit unit includes a host interface, a memory interface and a memory management circuit. The host interface is configured to couple to a host system. The memory interface is configured to couple to a rewritable non-volatile memory module, wherein the rewritable non-volatile memory module includes a plurality of memory sub-modules, and each of the memory sub-modules includes a plurality of physical erasing units. The memory management circuit is coupled to the host interface and the memory interface, and configured to perform the following operations of: selecting at least one source physical erasing unit from at least one first physical erasing unit in the physical erasing units according to a valid data count of the at least one first physical erasing unit and a valid data count of each of the memory sub-modules; and copying valid data in the at least one source physical erasing unit to at least one destination physical erasing unit in the physical erasing units to perform a valid data merging operation.

The disclosure proposes a flash memory storage device, which includes a connection interface unit, a rewritable non-volatile memory module and a flash memory control circuit unit. The connection interface unit is configured to couple to a host system. The rewritable non-volatile memory module includes a plurality of memory sub-modules, and each of the memory sub-modules includes a plurality of physical erasing units. The flash memory control circuit unit is configured to couple to the connection interface unit and the rewritable non-volatile memory module, and configured to perform the following operations: selecting at least one source physical erasing unit from at least one first physical erasing unit in the physical erasing units according to a valid data count of the at least one first physical erasing unit and a valid data count of each of the memory sub-modules; and copying valid data in the at least one source physical erasing unit to at least one destination physical erasing unit in the physical erasing units to perform a valid data merging operation.

Based on the above, the data merging method for flash memory, the flash memory storage device and the flash memory control circuit unit memory proposed by the disclosure can allow the source physical erasing units for performing the valid data merging operation to be evenly distributed among the memory sub-modules, so as to improve the execution efficiency of the valid data merging operation.

DESCRIPTION OF THE EMBODIMENTS

In general, a flash memory storage device (a.k.a. a memory storage system) includes a rewritable non-volatile memory module and a controller (a.k.a. a control circuit). The flash memory storage device is usually configured together with a host system so the host system can write data into the flash memory storage device or read data from the flash memory storage device.

Figure 1:
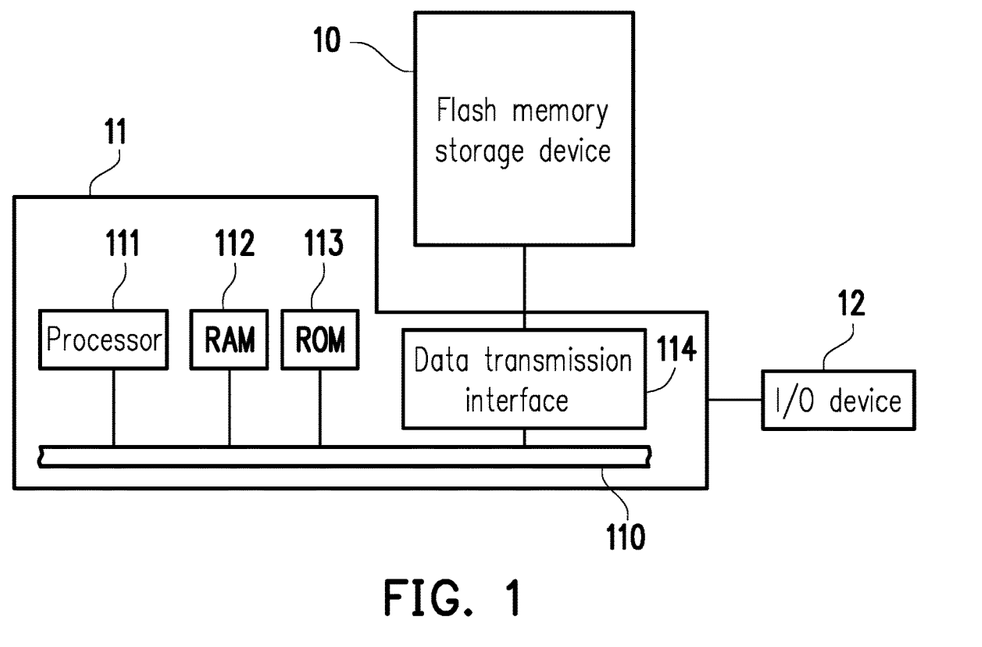
FIG. 1 is a schematic diagram illustrating a host system, a flash memory storage device and an I/O (input/output) device according to an exemplary embodiment of the disclosure.
Figure 2:
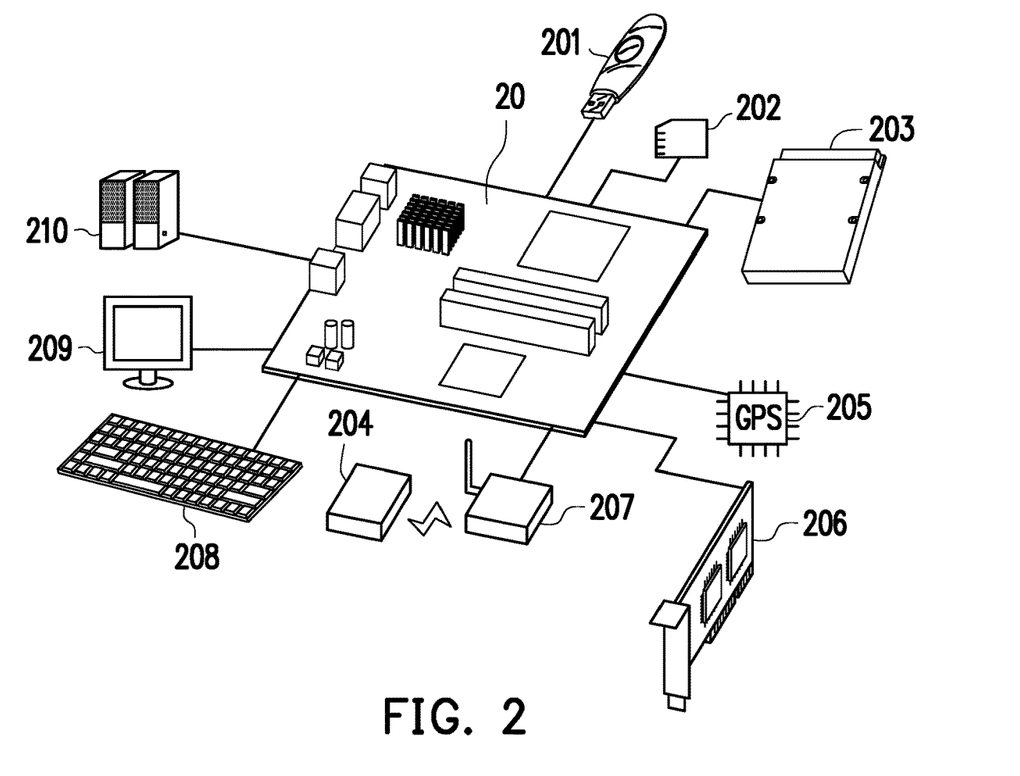
FIG. 2 is a schematic diagram illustrating a host system, a flash memory storage device and an I/O device according to another exemplary embodiment of the disclosure.

FIG. 1 is a schematic diagram illustrating a host system, a flash memory storage device and an I/O (input/output) device according to an exemplary embodiment of the disclosure. FIG. 2 is a schematic diagram illustrating a host system, a flash memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a flash memory storage device 10 through the data transmission interface 114. For example, the host system 11 may store data into the flash memory storage device 10 or read data from the flash memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the flash memory storage device 10 in a wired manner or a wireless manner. The flash memory storage device 10 may be, for example, a flash drive 201, a memory card 202, a SSD (Solid State Drive) 203 or a wireless memory storage device 204. The wireless memory storage device 204 may be, for example, a flash memory storage device based on various wireless communication technologies, such as a NFC (Near Field Communication) flash memory storage device, a WiFi (Wireless Fidelity) flash memory storage device, a Bluetooth flash memory storage device, a BLE (Bluetooth low energy) flash memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
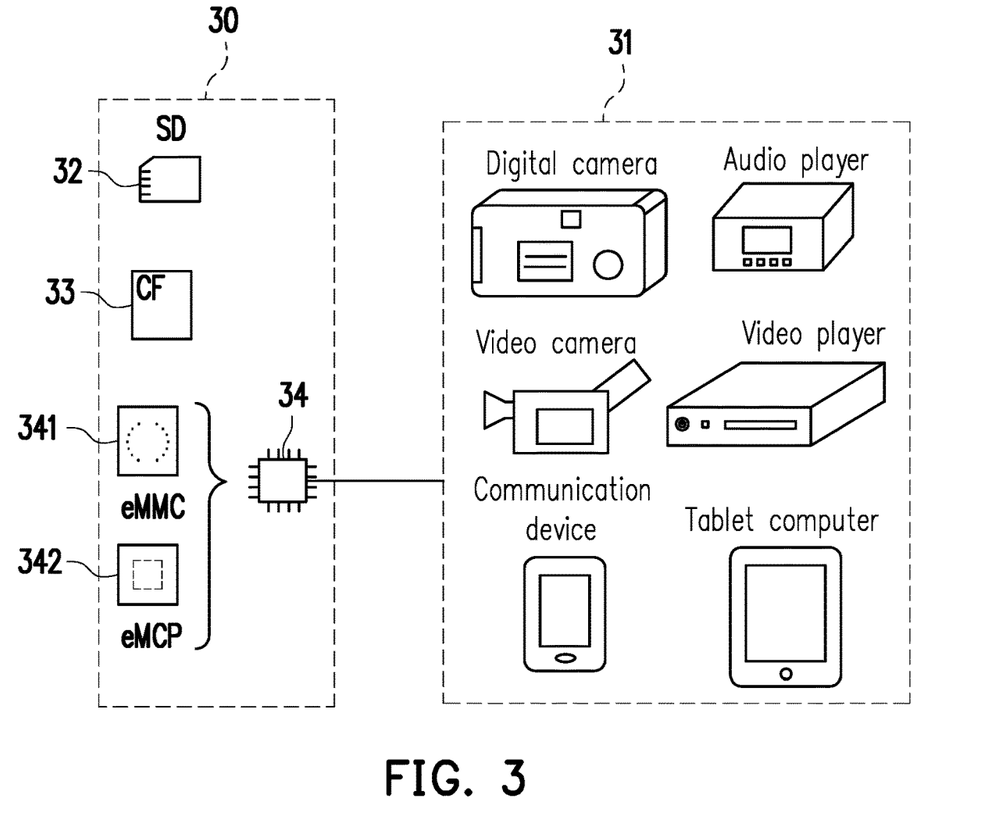
FIG. 3 is a schematic diagram illustrating a host system and a flash memory storage device according to another exemplary embodiment of the disclosure.

In an exemplary embodiment, aforementioned host system may be any system capable of substantially cooperating with the flash memory storage device for storing data. Although the host system is illustrated as a computer system in foregoing exemplary embodiment, nonetheless, FIG. 3 is a schematic diagram illustrating a host system and a flash memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a flash memory storage device 30 may be various non-volatile flash memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
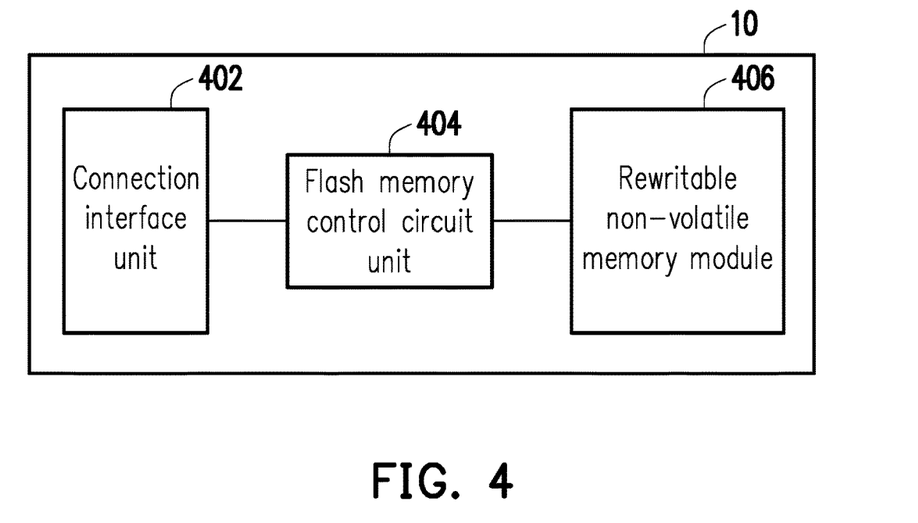
FIG. 4 is a schematic block diagram illustrating a flash memory storage device according to an exemplary embodiment of the disclosure.

FIG. 4 is a schematic block diagram illustrating a flash memory storage device according to an exemplary embodiment of the disclosure.

Referring to FIG. 4, the flash memory storage device 10 includes a connection interface unit 402, a flash memory control circuit unit 404 and a rewritable non-volatile memory module 406.

The connection interface unit 402 is configured to couple to the flash memory storage device 10 to the host system 11. In the present exemplary embodiment, the connection interface unit 402 is compatible with a PCI Express (Peripheral Component Interconnect Express) interface standard, and is also compatible with an NVM express interface standard. Specifically, the NVM express interface standard refers to a protocol for communication between the host system and the flash memory storage device, which defines register interface, command set and feature set between a controller of the flash memory storage device and an operating system of the host system and aims to improve a data access speed and a data transmission rate for the PCIe interface-based flash memory storage device by optimizing the interface standard of the flash memory storage device. However, in another exemplary embodiment, the connection interface unit 402 may also be compatible with other suitable standards. In addition, the connection interface unit 402 and the flash memory control circuit unit 404 may be packaged into one chip, or the connection interface unit 402 is distributed outside of a chip containing the flash memory control circuit unit 404.

The flash memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the flash memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as the error correcting code). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
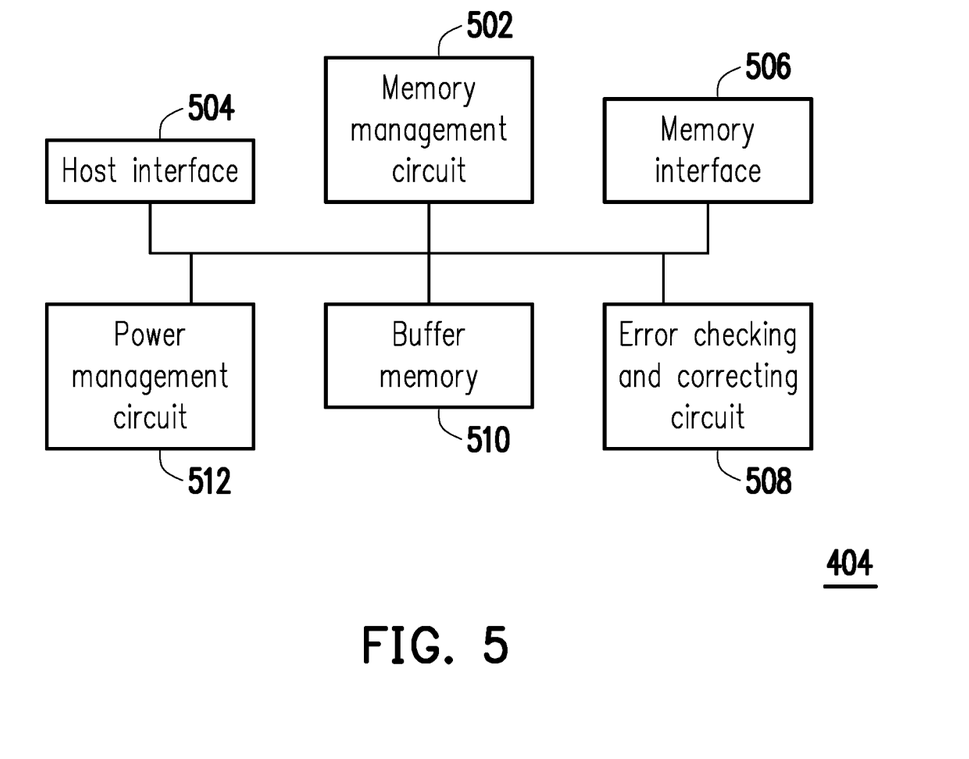
FIG. 5 is a schematic block diagram illustrating a flash memory control circuit unit according to an exemplary embodiment of the disclosure.

FIG. 5 is a schematic block diagram illustrating a flash memory control circuit unit according to an exemplary embodiment of the disclosure.

Referring to FIG. 5, the flash memory control circuit unit 404 includes a memory management circuit 502, a host interface 504 and a memory interface 506.

The memory management circuit 502 is configured to control overall operation of the flash memory control circuit unit 404. Specifically, the memory management circuit 502 has a plurality of control commands. When the flash memory storage device 10 operates, the control commands are executed to perform various operations such as data writing, data reading and data erasing. Hereinafter, operations of the memory management circuit 502 are described as equivalent to operations of the flash memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the flash memory storage device 10 operates, the control commands are executed by the microprocessor to execute operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the flash memory control circuit unit 404 is enabled. Then, the control commands are executed by the microprocessor unit to perform operations of writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the PCI Express standard. However, it should be understood that the disclosure is not limited thereto, and the host interface 504 may also be compatible with the PATA standard, the IEEE 1394 standard, the SATA standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the flash memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates the error correcting code (ECC) or the error detecting code (EDC) for data corresponding to the write command, and the memory management circuit 502 writes data and the ECC or the EDC corresponding to the write command into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the flash memory storage device 10.

Figure 6:
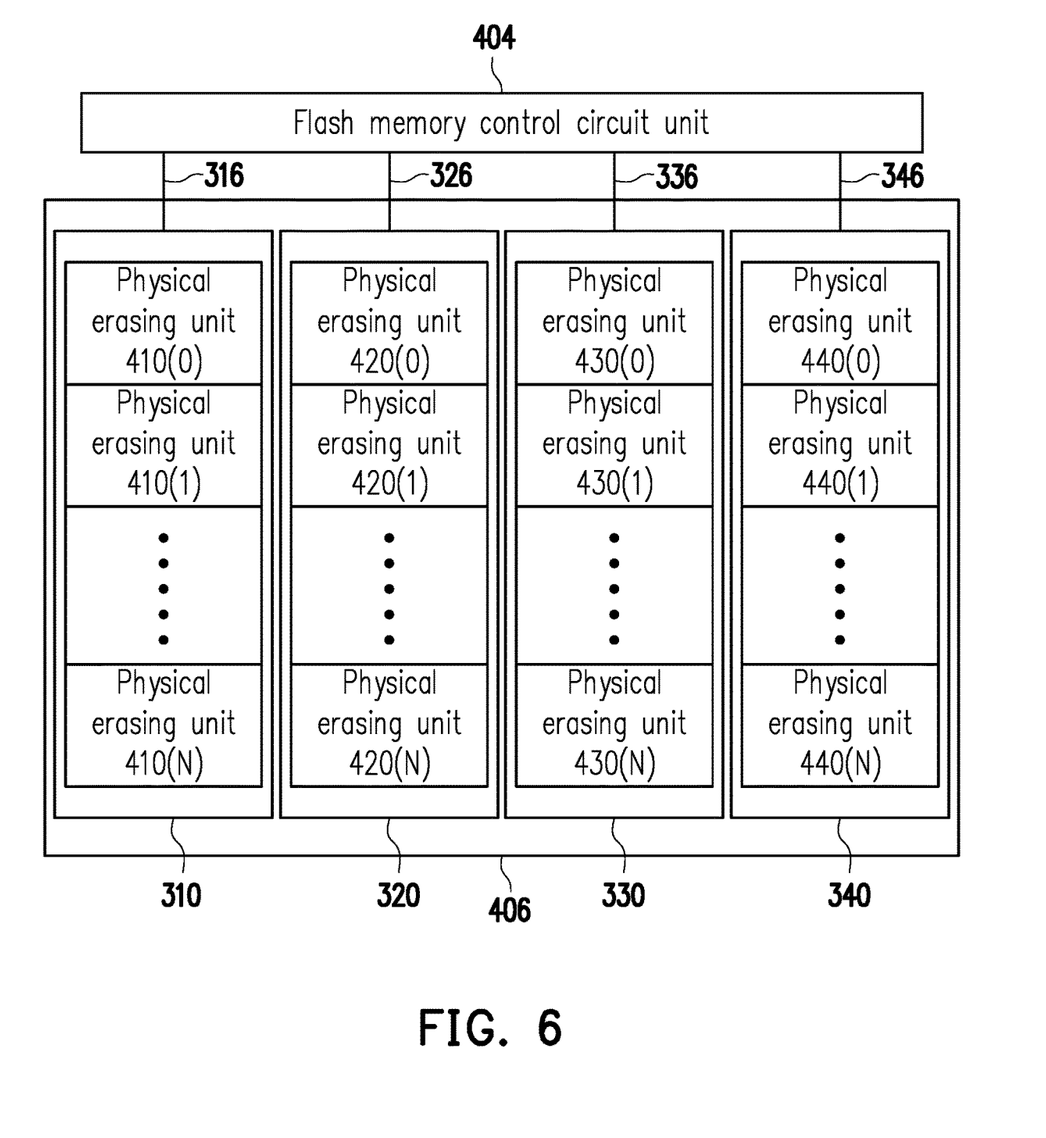
FIG. 6 is a schematic block diagram illustrating a rewritable non-volatile memory module according to an exemplary embodiment of the disclosure.

FIG. 6 is a schematic block diagram illustrating a rewritable non-volatile memory module according to an exemplary embodiment of the disclosure.

Referring to FIG. 6, the rewritable non-volatile memory module 406 includes a first memory sub-module 310, a second memory sub-module 320, a third memory sub-module 330 and a fourth memory sub-module 340. For example, each of the first, the second, the third and the fourth memory sub-modules 310, 320, 330 and 340 is a memory die. The first memory sub-module 310 includes physical erasing units 410(0) to 410(N). The second memory sub-module 320 includes physical erasing units 420(0) to 420(N). The third memory sub-module 330 includes physical erasing units 430(0) to 430(N). The fourth memory sub-module 340 includes physical erasing units 440(0) to 440(N).

For example, the first, the second, the third and the fourth memory sub-modules 310, 320, 330 and 340 are coupled to the flash memory control circuit unit 404 through independent data buses 316, 326, 336 and 346, respectively. Accordingly, the memory management circuit 502 can write data into the first, the second, the third and the fourth memory sub-modules 310, 320, 330 and 340 respectively via the data buses 316, 326, 336 and 346 in a parallel manner.

However, it should be understood that, in another exemplary embodiment of the disclosure, the first, the second, the third and the fourth memory sub-modules 310, 320, 330 and 340 may also be coupled to the flash memory control circuit unit 404 through only one data bus. Here, the memory management circuit 502 can write data into the first, the second, the third and the fourth memory sub-modules 310, 320, 330 and 340 respectively via one data bus in an interleave manner.

In particular, each of the first, the second, the third and the fourth memory sub-modules 310, 320, 330 and 340 may include a plurality of word lines. A plurality of memory cells on the same word form a plurality of physical pages, and a plurality of physical pages on the same word line may be referred to as a physical page set. Each of the physical erasing units of the first, the second, the third and the fourth memory sub-modules 310, 320, 330 and 340 has a plurality of physical pages. Here, the physical pages belonging to the same physical erasing unit may be written independently and erased simultaneously. For example, each physical erasing unit is composed of 128 physical pages. Nevertheless, it should be understood that the disclosure is not limited in this regard. Each physical erasing unit may be composed of 64 physical pages, 256 physical pages or any number of the physical pages.

More specifically, the physical erasing unit is a minimum unit for erasing. Namely, each physical erasing unit contains the least number of memory cells to be erased together. The physical page is the minimum unit for programming. That is, the physical page is the minimum unit for writing data. However, it should be understood that, in another exemplary embodiment of the disclosure, the minimum unit for writing data may also be a sector or other units. Each of the physical pages usually includes a data bit area and a redundant bit area. The data bit area is configured for storing the user data, and the redundant bit area is configured for storing the system data (e.g., an error checking and correcting (ECC) code). It should be noted that, in another exemplary embodiment, one physical unit may also refer to one physical address, one physical programming unit, or a composition of a plurality of continuous or discontinuous physical addresses.

It is noted that, although the exemplary embodiment of the disclosure is described by using the rewritable non-volatile memory module 406 that includes four memory sub-modules as an example, the disclosure is not limited thereto. In other embodiments, the rewritable non-volatile memory module 406 may also include two, six, eight or ten memory sub-modules.

Here, it is assumed that the memory management circuit 502 logically divides the physical erasing units in the rewritable non-volatile memory module 406 at least into a data area and a spare area. The physical erasing units logically belonging to the data area and the spare area are configured to store data from the host system 11. More specifically, the physical erasing units of the data area are regarded as the physical erasing units stored with the data, whereas the physical erasing units of the spare area are configured to replace the physical erasing units of the data area. In other words, when the write command and the data to be written are received from the host system 11, the memory management circuit 502 selects the physical erasing units from the spare area, and writes the data into the selected physical erasing units for replacing the physical erasing units in the data area.

In particular, the number of the physical erasing units in the data area and the spare area may be different according to the different memory specifications used. It should be understood that, during operations of the flash memory storage device 10, grouping relations of the physical erasing units associated to the data area and the spare area may be dynamically changed. In addition, although it is described in the present embodiment that the rewritable non-volatile memory module 406 includes the data area and the spare area, the rewritable non-volatile memory module 406 may also include other areas in other embodiments.

When the number of spare physical erasing units in the spare area in the rewritable non-volatile memory module 406 is not greater than a predefined value, the memory management circuit 502 will perform a valid data merging operation. For example, the memory management circuit 502 performs the data merging operation of the disclosure to select, from the physical erasing units of the data area (a.k.a. first physical erasing units), a source physical erasing unit that will be subsequently used for performing the valid data merging operation. In this embodiment, it is assumed that the memory management circuit 502 maintains a source pool. The source pool includes source physical erasing units already selected for performing the valid data merging operation (hereinafter referred to other source physical erasing units), but those source physical erasing units are yet not used for performing the valid data merging operation.

The following embodiment illustrates how the disclosure selects the source physical erasing unit First of all, the memory management circuit 502 calculates a reference value of each of the first physical erasing units according to a valid data count of each of the first physical erasing units, a cold/hot degree of valid data of each of the first physical erasing units and a valid data count of each of memory sub-modules.

For example, the memory management circuit 502 may access a logical address-physical address mapping table. This logical address-physical address mapping table is used to record in which physical erasing unit each valid data in the rewritable nonvolatile memory module 406 is currently stored. The memory management circuit 502 may learn from the logical address-physical address mapping table which valid data of the logical address is stored in one specific physical erasing unit, and accordingly learn of a valid data count of that specific physical erasing unit. However, how to obtain the valid data count of one physical erasing unit may also be learnt by other conventional techniques, which are not repeated here.

Here, the memory management circuit 502 may access a cold/hot degree record table. The cold/hot degree record table is used to record the number of times data of a logical address is accessed. After the memory management circuit 502 has learnt from the logical address-physical address mapping table which valid data of the logical address is stored in one specific physical erasing unit, 2 the memory management circuit 502 may access the cold/hot degree record table to calculate a sum of the number of times (or a frequency) valid data in that specific physical erasing unit is accessed, and accordingly learn of the cold/hot degree of the valid data of that specific physical erasing unit. However, how to obtain a cold/hot degree of valid data of one physical erasing unit may also be learnt by other conventional techniques, which are not repeated here.

How to obtain the valid data count of one memory sub-module will be described in detail later.

A reference value of a physical erasing unit (hereinafter referred to as a third physical erasing unit) is calculated in the following content as an example for description. A similar method may be applied to other physical erasing units. The memory management circuit 502 may obtain the reference value of the third physical erasing unit through Equation (1) below:

$$K = (k_1 \times X) + (k_2 \times Y) + \left(k_3 \times \left(\sum_{i=0}^{n} N[CE]\right)\right) \quad (1)$$

Here, K represents the reference value of the third physical erasing unit. X is a valid data count of the third physical erasing unit, and k1 is a weight value (a.k.a. a first weight). Y is a cold/hot degree of data in the third physical erasing unit, and k2 is a weight value (a.k.a. a second weight). In addition, N[CE] represents a valid data count of a $CE^{th}$ memory sub-module, $\Sigma_{i=0}^{n} N[CE]$ represents a sum of valid data counts of all the memory sub-modules (i.e., the memory sub-modules 310 to 340), and k3 is a weight value (a.k.a. a third weight).

Hereinafter, a product of the valid data count of the third physical erasing unit (i.e., X) and the first weight (i.e., k1) is referred to as "a first value"; a product of the cold/hot degree of the third physical erasing unit (Y) and the second weight (i.e., k2) is referred to as "a second value"; a product of the sum of the valid data counts of the memory sub-modules 310 to 340 (i.e., $\Sigma_{i=0}^{n} N[CE]$) and the third weight (i.e., k3) is referred to as "a third value". The memory management circuit 502 identifies a sum (i.e., K) of the first value, the second value and the third value as the reference value of the third physical erasing unit.

How to calculate a valid data count included by one memory sub-module is described as follows. In continuation with the foregoing example, in the process of calculating the reference value of the third physical erasing unit, the memory management circuit 502 may calculate the valid data count of each of the memory sub-modules with reference to Equation (2) below. Calculation of a valid data count N[CE] included by the first memory sub-module 310 may refer to the following Equation (2):

$$N[CE] = \left(\frac{\sum_{i=0}^{n} N_i[CE]}{n} - \frac{\sum_{i=0}^{n-1} N_i}{n \times ce\_cnt}\right)^2 \quad (2)$$

Here, it should be noted that, in the process of calculating the reference value of the third physical erasing unit, the memory management circuit 502 will assume that the third physical erasing unit is already added to the source pool described above. $N_i[CE]$ represents a valid data count of an $i^{th}$ source physical erasing unit in the first memory sub-module 310 already added in the source pool of the third physical erasing unit, and $\Sigma_{i=0}^{n} N_i[CE]$ represents a valid data count of all the source physical erasing units in the first memory sub-module 310 in the source pool. In other words, $\Sigma_{i=0}^{n} N_i[CE]$ represents a sum of valid data counts of source physical erasing units in the first memory sub-module 310 not yet added to the source pool of the third physical erasing unit (i.e., "the other source physical erasing units" described above) plus the valid data count of the third physical erasing unit in the first memory sub-module 310. Hereinafter, a value of $\Sigma_{i=0}^{n} N_i[CE]$ is referred to as "a fourth value". Further, n represents a number of "the other source physical erasing units" described above. The memory management circuit 502 divides the fourth value by the number of "the other source physical erasing units" (i.e., n) to obtain an average valid data count (a.k.a. a first average valid data count) of the first memory sub-module 310.

Furthermore, in Equation (2), Ni represents a valid data count of an $i^{th}$ other source physical erasing unit not yet added to the source pool of the third physical erasing unit, and $\Sigma_{i=0}^{n-1} N_i$ represents a sum of valid data counts of the other source physical erasing units not yet added to the source pool of the third physical erasing unit. n represents the number of the other source physical erasing units described above. ce_cnt represents a number of the memory sub-modules 310 to 340 in the rewritable non-volatile memory module 406. The memory management circuit 502 divides the sum of the valid data counts of the other source physical erasing units (i.e., $\Sigma_{i=0}^{n-1} N_i$) by a product of the number of the other source physical erasing units (i.e., n) and the number of the memory sub-modules (i.e., ce_cnt) to obtain an average valid data count (a.k.a. a second average valid data count) of the memory sub-modules 310 to 340.

Then, the memory management circuit 502 may obtain a square of a difference between the first average valid data count $$\left(i.e., \frac{\sum_{i=0}^{n} N_i[CE]}{n+1}\right)$$

and the second average valid data count $$\left(i.e., \frac{\sum_{i=0}^{n-1} N_i}{n \times ce\_cnt}\right)$$

to obtain N[CE] that represents the valid data count of the first memory sub-module 310.

In the above manner, the reference value of each physical erasing units in the first physical erasing units may be calculated, and then the source physical erasing units may be selected from the first physical erasing units according to these reference values.

For example, the memory management circuit 502 identifies a physical erasing unit (a.k.a. a second physical erasing unit) in the first physical erasing units having the reference value less than a threshold as the source physical erasing unit that can be used for identifying the valid data merging operation, and adds the source physical erasing unit to the source pool. Later, when the valid data merging operation is to be performed, the memory management circuit 502 selects a source physical erasing unit form the source pool, and copies the valid data in the selected source physical erasing unit to one specific physical erasing unit (a.k.a. a destination physical erasing unit) to perform the valid data merging operation.

Figure 7A:
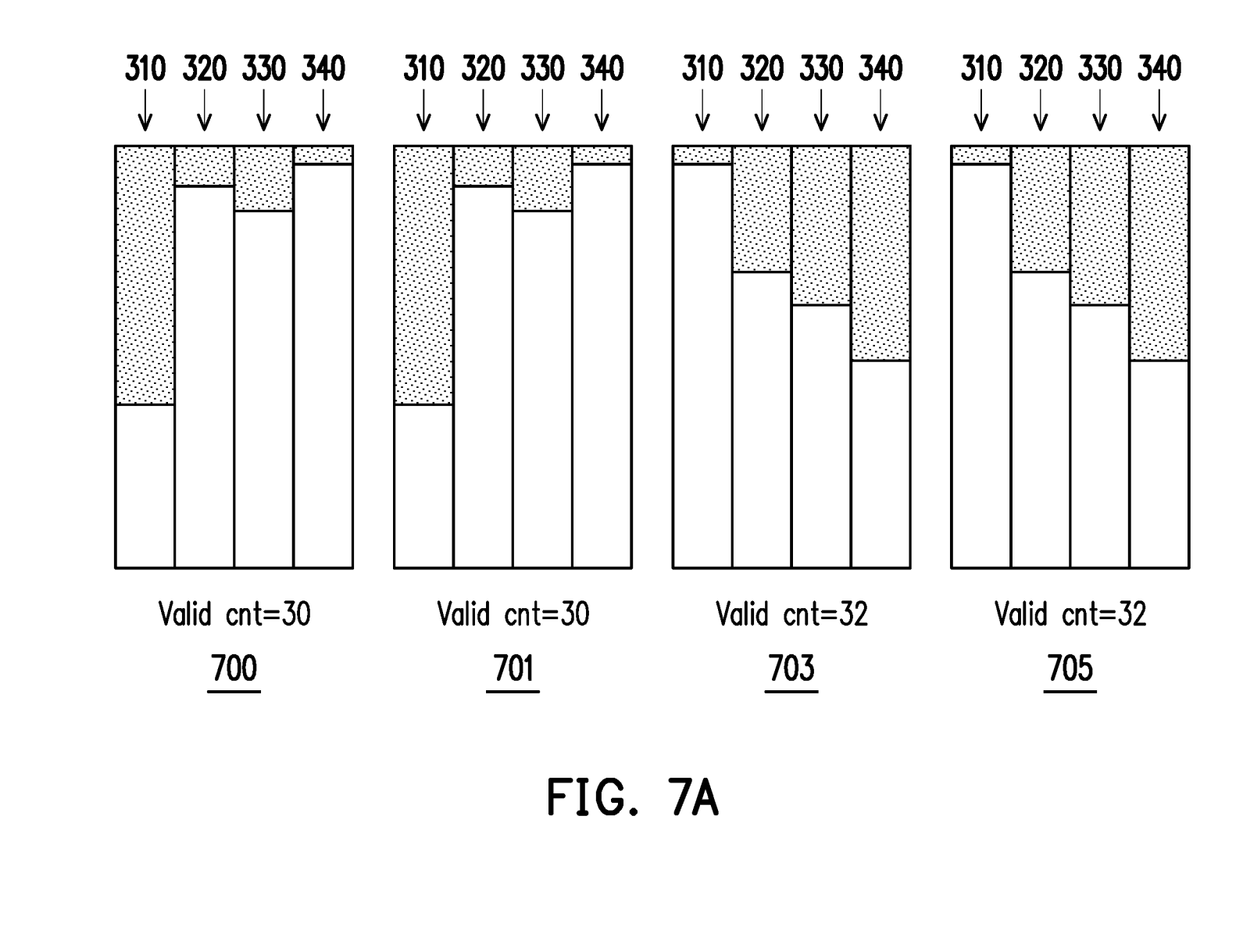
FIG. 7A is a schematic diagram for a source physical erasing unit identified for performing the valid data merging operation illustrated according to an exemplary embodiment of the disclosure.
Figure 7B:
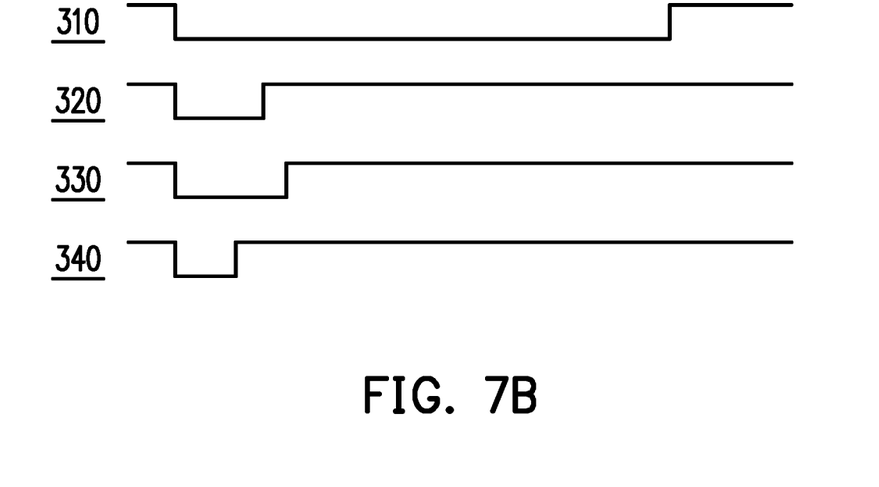
FIG. 7B and FIG. 7C are schematic diagrams for determining whether a memory sub-module is in a busy state illustrated according to an exemplary embodiment of the disclosure.
Figure 7C:
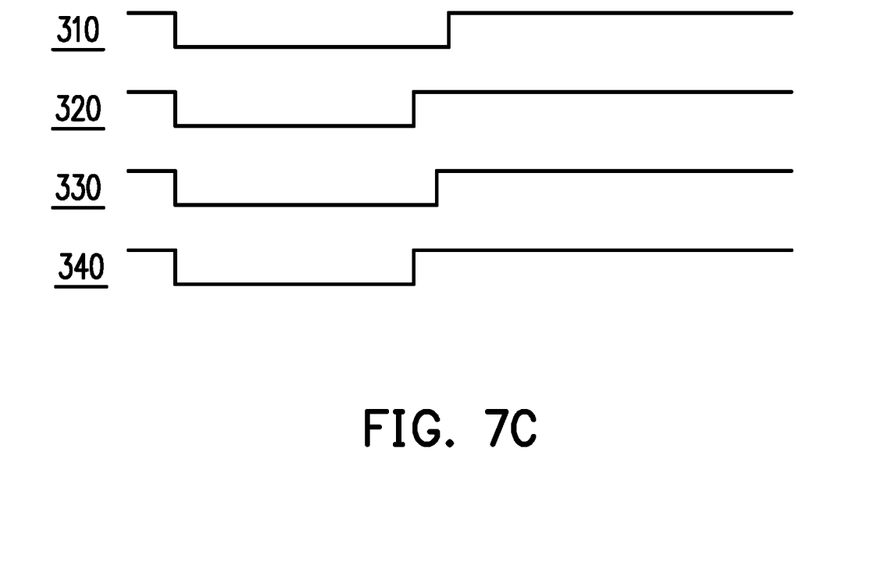

FIG. 7A is a schematic diagram for a source physical erasing unit identified for performing the valid data merging operation illustrated according to an exemplary embodiment of the disclosure. FIG. 7B and FIG. 7C are schematic diagrams for determining whether a memory sub-module is in a busy state illustrated according to an exemplary embodiment of the disclosure.

Referring to FIG. 7A, in the example of FIG. 7A, it is assumed that there are currently four physical erasing units 700 to 705 that are used to determine whether they are the source physical erasing unit to be used for performing the valid data merging operation. It is assumed that a valid data count of the physical erasing unit 700 is 30 (i.e., valid cnt=30); a valid data count of the physical erasing unit 701 is 30 (i.e., valid cnt=30); a valid data count of the physical erasing unit 703 is 32 (i.e., valid cnt=32); a valid data count of the physical erasing unit 705 is 32 (i.e., valid cnt=32). For descriptive convenience, in this example, it is assumed that data of each physical erasing unit of the physical erasing units 701 to 705 may be distributed respectively in the different memory sub-modules 310 to 340. Among them, the gray part in each memory sub-module of each physical erasing unit in FIG. 7 is valid data.

Generally speaking, in the conventional method, the memory management circuit 502 will select at least one physical erasing unit having the smallest valid data count as the source physical erasing unit for performing the valid data merging operation. In this example, if the conventional method is used, the memory management circuit 502 will select, for example, the physical erasing units 700 and 701 having the smallest valid data count as the source physical erasing unit for performing the valid data merging operation. As can be seen from FIG. 7, most of the valid data in the physical erasing units 700 and 701 are located in the memory sub-module 310. Therefore, when the physical erasing units 700 and 701 are used for performing the valid data merging operation, the memory sub-modules 320 to 340 will have to wait for the memory sub-module 310 to finish operating. This situation will cause low execution inefficient of the valid data merging operation. For example, referring to FIG. 7B, it is assumed that low potential represents "a busy state" and high potential represents "an idle state" in FIG. 7B. When the valid data merging operation is to be performed in the above example, since data to be moved in the memory sub-module 310 is relatively more, after the memory sub-modules 320 to 340 have returned from the busy state to the idle state, the memory sub-modules 320 to 340 will be forced to spend a lot of time waiting for the memory sub-module 310 to finish moving the data (i.e., waiting due to the busy state of the memory sub-module 310). This situation will cause low execution inefficient of the valid data merging operation.

However, in this disclosure, as the source physical erasing unit is selected by referring to the valid data counts in the memory sub-modules 310 to 340, the memory management circuit 502 will select the physical erasing unit 700 and the physical erasing unit 703 as the source physical erasing unit for performing the valid data merging operation. In particular, as can seen from FIG. 7A, a sum of valid data counts of the physical erasing unit 700 and the physical erasing unit 703 in the memory sub-module 310 will be close to a sum of valid data counts of the physical erasing unit 700 and the physical erasing unit 703 in the memory sub-module 320, a sum of valid data counts of the physical erasing unit 700 and the physical erasing unit 703 in the memory sub-module 330 and a sum of valid data counts of the physical erasing unit 700 and the physical erasing unit 703 in the memory sub-module 340. Therefore, when the physical erasing unit 700 and the physical erasing unit 703 are used for performing the valid data merging operation, multiple memory sub-modules may be prevented from spending a long time waiting for another memory sub-module to finish operating so the execution inefficient of the valid data merging operation may be effectively improved. For example, referring to FIG. 7C, as similar to FIG. 7C, it is assumed that low potential represents "the busy state" and high potential represents "the idle state" in FIG. 7C. In the above example, since amounts of data to be moved are quite close for each memory sub-module of the memory sub-modules 310 to 340, the memory sub-modules 310 to 340 will return from the busy state to the idle state at about the same time. As can be seen from FIG. 7C, the data merging operation for flash memory of the disclosure may prevent the memory sub-modules from spending a log time waiting for another memory sub-module to finish operating.

Figure 8:
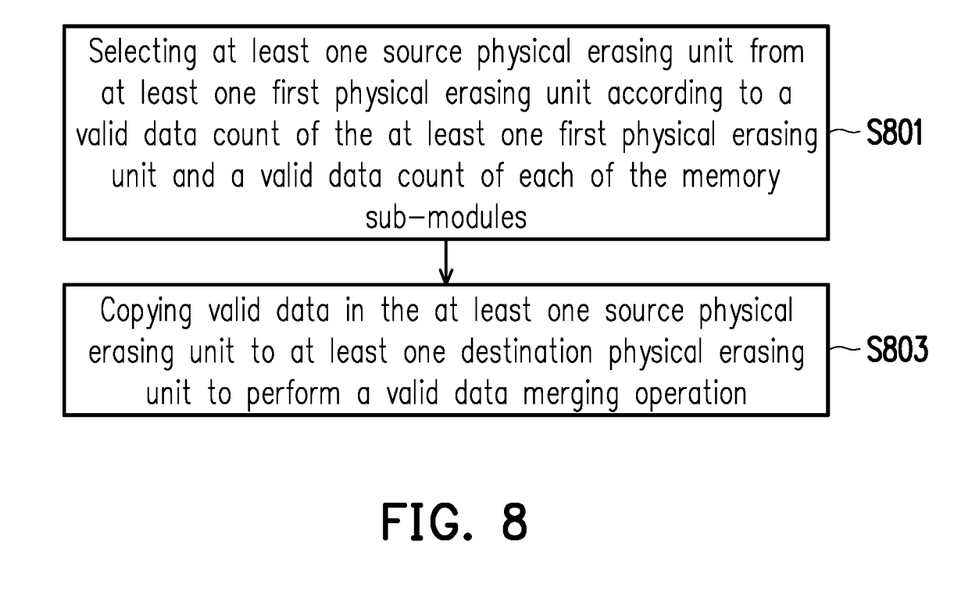
FIG. 8 is a flowchart illustrating a data merging method for flash memory according to an embodiment of the disclosure.

FIG. 8 is a flowchart illustrating a data merging method for flash memory according to an embodiment of the disclosure.

Referring to FIG. 8, in step S801, the memory management circuit 502 selects at least one source physical erasing unit from at least one first physical erasing unit according to a valid data count of the at least one first physical erasing unit and a valid data count of each of a plurality of memory sub-modules. Then, in step S803, the memory management circuit 502 copies valid data in the source physical erasing unit to a destination physical erasing unit to perform a valid data merging operation.

In summary, the data merging method for flash memory, the flash memory storage device and the flash memory control circuit unit proposed by disclosure can allow the source physical erasing units for performing the valid data merging operation to be evenly distributed among the memory sub-modules, so as to improve the execution efficiency of the valid data merging operation.

What is claimed is:

1. A data merging method for flash memory adapted to a rewritable non-volatile memory module, the rewritable non-volatile memory module comprising a plurality of memory sub-modules, each of the plurality of memory sub-modules comprising a plurality of physical erasing units, the method comprising:

generating a reference value for each respective physical erasing unit of first physical erasing units among the physical erasing units of each of the plurality of memory sub-modules according to a valid data count of the respective physical erasing unit of the first physical erasing units, an access frequency degree of valid data of the respective physical erasing unit of the first physical erasing units and a state value of each memory sub-module of the plurality of memory sub-modules;

identifying at least one second physical erasing unit having a reference value, of the reference values for each respective physical erasing unit, less than a threshold as at least one source physical erasing unit from the first physical erasing units; and copying valid data in the at least one source physical erasing unit to at least one destination physical erasing unit selected from the physical erasing units of each of the plurality of memory sub-modules to perform a valid data merging operation, wherein a step of generating the reference value for each respective physical erasing unit of the first physical erasing units includes: multiplying a valid data count of a third physical erasing unit selected from the first physical erasing units by a first weight to obtain a first value; multiplying an access frequency degree of valid data of the third physical erasing unit by a second weight to obtain a second value; multiplying a sum of the state values of the plurality of memory sub-modules by a third weight to obtain a third value; and identifying a sum of the first value, the second value and the third value as the reference value of the third physical erasing unit, wherein the plurality of memory sub-modules comprise a first memory sub-module, the physical erasing units of the first memory sub-module comprise at least one other source physical erasing unit, the data merging method further comprises: adding a sum of valid data counts of the at least one other source physical erasing unit to the valid data count of the third physical erasing unit in the first memory sub-module to obtain a fourth value, and dividing the fourth value by a count of the at least one other source physical erasing unit to obtain a first calculated value; dividing the sum of the valid data counts of the at least one other source physical erasing unit by a product of the count of the at least one other source physical erasing unit and a count of the plurality of memory sub-modules to obtain a second calculated value; and obtaining a square of a difference between the first calculated value and the second calculated value as the state value of the first memory sub-module.

2. The data merging method for flash memory according to claim 1, wherein the at least one other source physical erasing unit composes a source pool, wherein before a step of performing the valid data merging operation, the method further comprises:

adding the at least one source physical erasing unit to the source pool.

3. A flash memory control circuit unit for controlling a rewritable non-volatile memory module, the flash memory control circuit unit comprising:

a host interface, configured to couple to a host system, a memory interface, configured to couple to the rewritable non-volatile memory module, wherein the rewritable non-volatile memory module comprises a plurality of memory sub-modules, and each of plurality of the memory sub-modules comprises a plurality of physical erasing units;

a memory management circuit, coupled to the host interface and the memory interface, wherein the memory management circuit is configured to generate a reference value for each respective physical erasing unit of first physical erasing units among the physical erasing units of each of the plurality of memory sub-modules according to a valid data count of the respective physical erasing unit of the first physical erasing units, an access frequency degree of valid data of the respective physical erasing unit of the first physical erasing units and a state value of each memory sub-module of the plurality of memory sub-modules, wherein the memory management circuit is further configured to identify at least one second physical erasing unit having a reference value, of the reference values for each respective physical erasing unit, less than a threshold as at least one source physical erasing unit from the first physical erasing units, wherein the memory management circuit is further configured to copy valid data in the at least one source physical erasing unit to at least one destination physical erasing unit selected from the physical erasing units of each of the plurality of sub-modules to perform a valid data merging operation, wherein in an operation of generating the reference value for each respective physical erasing unit of the first physical erasing units includes, the memory management circuit multiplies a valid data count of a third physical erasing unit selected from the first physical erasing units by a first weight to obtain a first value, multiplies an access frequency degree of valid data of the third physical erasing unit by a second weight to obtain a second value, multiplies a sum of the state values of the plurality of memory sub-modules by a third weight to obtain a third value, and identifies a sum of the first value, the second value and the third value as the reference value of the third physical erasing unit, wherein the plurality of memory sub-modules comprise a first memory sub-module, the physical erasing units of the first memory sub-module comprise at least one other source physical erasing unit, the memory management circuit adds a sum of valid data counts of the at least one other source physical erasing unit to the valid data count of the third physical erasing unit in the first memory sub-module to obtain a fourth value, and divides the fourth value by a count of the at least one other source physical erasing unit to obtain a first calculated value, divides the sum of the valid data counts of the at least one other source physical erasing unit by a product of the count of the at least one other source physical erasing unit and a count of the plurality of memory sub-modules to obtain a second calculated value, and obtains a square of a difference between the first calculated value and the second calculated value as the state value of the first memory sub-module.

4. The flash memory control circuit unit according to claim 3, wherein the at least one other source physical erasing unit composes a source pool, wherein before an operation of performing the valid data merging operation, the memory management circuit is further configured to add the at least one source physical erasing unit to the source pool.

5. A flash memory storage device, comprising:

a connection interface unit configured to couple to a host system;

a rewritable non-volatile memory module, wherein the rewritable non-volatile memory module comprises a plurality of memory sub-modules, and each of plurality of the memory sub-modules comprise a plurality of physical erasing units; and a flash memory control circuit unit, coupled to the connection interface unit and the rewritable non-volatile memory module, wherein the flash memory control circuit unit is configured to generate a reference value for each respective physical erasing unit of first physical erasing units among the physical erasing units of each of the plurality of memory sub-modules according to a valid data count of the respective physical erasing unit of the first physical erasing units, an access frequency degree of valid data of the respective physical erasing unit of the first physical erasing units and a state value of each memory sub-module of the plurality of memory sub-modules, wherein the flash memory control circuit unit is further configured to identify at least one second physical erasing unit having a reference value, of the reference values for each respective physical erasing unit, less than a threshold as at least one source physical erasing unit from the first physical erasing units, wherein the flash memory control circuit unit is further configured to copy valid data in the at least one source physical erasing unit to at least one destination physical erasing unit selected from the physical erasing units of each of the plurality of sub-modules to perform a valid data merging operation, wherein in an operation of generating the reference value for each respective physical erasing unit of the first physical erasing units includes, the flash memory control circuit unit multiplies a valid data count of a third physical erasing unit selected from the first physical erasing units by a first weight to obtain a first value, multiplies an access frequency degree of valid data of the third physical erasing unit by a second weight to obtain a second value, multiplies a sum of the state values of the plurality of memory sub-modules by a third weight to obtain a third value, and identifies a sum of the first value, the second value and the third value as the reference value of the third physical erasing unit, wherein the plurality of memory sub-modules comprise a first memory sub-module, the physical erasing units of the first memory sub-module comprise at least one other source physical erasing unit, the flash memory control circuit unit adds a sum of valid data counts of the at least one other source physical erasing unit to the valid data count of the third physical erasing unit in the first memory sub-module to obtain a fourth value, and divides the fourth value by a count of the at least one other source physical erasing unit to obtain a first calculated value, divides the sum of the valid data counts of the at least one other source physical erasing unit by a product of the count of the at least one other source physical erasing unit and a count of the plurality of memory sub-modules to obtain a second calculated value, and obtains a square of a difference between the first calculated value and the second calculated value as the state value of the first memory sub-module.

6. The flash memory storage device according to claim 5, wherein the at least one other source physical erasing unit composes a source pool, wherein before an operation of performing the valid data merging operation, the flash memory control circuit unit is further configured to add the at least one source physical erasing unit to the source pool.

* * * * *